US010611894B2

(12) United States Patent
Kani

(10) Patent No.: US 10,611,894 B2
(45) Date of Patent: Apr. 7, 2020

(54) RESIN COMPOSITION AND MULTILAYER STRUCTURE USING SAME, AND METHOD OF IMPROVING LONG-RUN STABILITY

(71) Applicant: THE NIPPON SYNTHETIC CHEMICAL INDUSTRY CO., LTD., Osaka (JP)

(72) Inventor: Shouichi Kani, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 15/559,566

(22) PCT Filed: Apr. 5, 2016

(86) PCT No.: PCT/JP2016/061167
§ 371 (c)(1),
(2) Date: Sep. 19, 2017

(87) PCT Pub. No.: WO2016/163370
PCT Pub. Date: Oct. 13, 2016

(65) Prior Publication Data
US 2018/0044502 A1 Feb. 15, 2018

(30) Foreign Application Priority Data
Apr. 7, 2015 (JP) ................. 2015-078734

(51) Int. Cl.
C08K 5/098 (2006.01)
C08L 29/04 (2006.01)
C08L 77/00 (2006.01)
B29B 9/12 (2006.01)
B29B 9/06 (2006.01)

(52) U.S. Cl.
CPC ............... C08K 5/098 (2013.01); B29B 9/12 (2013.01); C08L 29/04 (2013.01); C08L 77/00 (2013.01); B29B 9/06 (2013.01); C08K 2201/014 (2013.01); Y02P 20/582 (2015.11)

(58) Field of Classification Search
None
See application file for complete search history.

(56) References Cited

U.S. PATENT DOCUMENTS

| 2009/0186233 A1 | 7/2009 | Masumoto et al. |
| 2011/0135950 A1 | 6/2011 | Okamoto et al. |
| 2012/0128961 A1 | 5/2012 | Yoshida et al. |

FOREIGN PATENT DOCUMENTS

| CN | 102482474 A | 5/2012 |
| EP | 1502931 A | 2/2005 |
| EP | 1698458 | 9/2006 |
| EP | 3056538 | 8/2016 |
| EP | 3168242 | 5/2017 |
| JP | 63-304060 | * 12/1988 |
| JP | H07-097491 A | 4/1995 |
| JP | H07-118469 | 5/1995 |
| JP | H07-118470 | 5/1995 |
| JP | H08-52845 | 2/1996 |
| JP | H08-58036 | 3/1996 |
| JP | H08-239528 | 9/1996 |
| JP | H08-253649 | 10/1996 |
| JP | 2000-136281 A | 5/2000 |
| JP | 2002-069259 A | 3/2002 |
| JP | 2002-338773 A | 11/2002 |
| JP | 2009-191255 A | 8/2009 |
| JP | 2010-059418 A | 3/2010 |
| JP | 2011/225800 A | 11/2011 |
| JP | 2012-193327 | 10/2012 |

OTHER PUBLICATIONS

Supplementary European Search Report for European Application No. 16776536.1 dated Jan. 17, 2019.
Partial Supplementary European Search Report issued in counterpart Patent Application No. EP16776536.1, dated Sep. 4, 2018.
International Search Report for Application No. PCT/JP2016/061167 dated May 31, 2016.
International Preliminary Report on Patentability for Application No. PCT/JP2016/061167 dated May 31, 2016.
Chinese Office Action dated Jun. 11, 2019 in corresponding Chinese Application No. 2016-80018328.3.
Notice of Reasons for Refusal issued in JP App. No. 2016-222988 dated Dec. 20, 2019, with Eng. translation.
2nd Office Action in Chinese Patent Application No. 201680018328.3 dated Jan. 13, 2022, with Eng. translation.

* cited by examiner

Primary Examiner — Ana L. Woodward
(74) Attorney, Agent, or Firm — Greenblum & Bernstein, P.L.C.

(57) ABSTRACT

Provided is a resin composition which has excellent gas barrier performance after hot water treatment and which both has long-run stability and suppress decomposition and foaming in operations conducted at a high temperature. This resin composition comprises a saponified ethylene-vinyl ester-based copolymer (A), a polyamide-based resin (B), and a drying agent (C), wherein the reduction in weight of the resin composition after being kept at 250° C. in a nitrogen atmosphere for 1 hour is 5% by weight or more but 35% by weight or less.

6 Claims, No Drawings

RESIN COMPOSITION AND MULTILAYER STRUCTURE USING SAME, AND METHOD OF IMPROVING LONG-RUN STABILITY

TECHNICAL FIELD

The present invention relates to a saponified ethylene-vinyl ester-based copolymer (hereinafter, sometimes referred to as "EVOH resin") composition, multilayer structure using the EVOH resin composition, and a method of improving long-run stability of the composition. In particular, the present invention relates to a resin composition whose gas-barrier performance is secured even after hot water treatment such as retort treatment, the resin composition which both has long-run stability in a process operation at high temperature, and is suppressed to decompose and foam. Also the present invention relates to a multilayer structure made from the resin composition and to a method of improving long-run stability of the resin composition.

BACKGROUND ART

EVOH resin, which contains hydroxyl groups, forms crystal structure due to strong hydrogen bond. The crystal structure can inhibit oxygen coming into EVOH resin and thereby imparting an excellent gas barrier performance such as oxygen gas-barrier performance to EVOH resin. For this property of the EVOH resin, a multilayer film comprising EVOH resin layer as a gas barrier layer is utilized as a wrapping film for food and so on. There is known that the gas barrier property of the multilayer film comprising EVOH resin layer is impaired by subjecting a wrapped article with the multilayer film to retort treatment or the like treatment which exposes to hot water for long time. The reason for the depression of the gas barrier performance of the multilayer film is supposed as follows: water comes into the EVOH resin layer from the outer edge of the multilayer film during the hot water treatment to destroy hydrogen bonds in EVOH resin, thereby allowing oxygen to come into the EVOH resin layer.

As a method of suppressing the depression of the gas barrier performance by the hot water treatment, adding a hydrate-forming metal salt as a drying agent to EVOH resin is known. A technique is also known that polyamide-based resin is added to EVOH resin to improve a resistance to hot water treatment. For instance, the patent document 1 discloses in Examples 7 and 8 that a resin composition in which a partially or completely dehydrated carboxylic acid salt hydrate is added to a mixture of EVOH resin and polyamide-based resin. These Examples show that by adding dehydrated disodium succinate hydrate excellent gas barrier performance were secured after the hot water treatment and value of melt viscosity at 230° C. were kept almost constant for hours.

The patent document 2 suggests an EVOH resin composition containing partially or completely dehydrated polyvalent metal sulfate hydrate as a drying agent in addition to the mixture of EVOH resin and polyamide-based resin. The EVOH resin composition can secure gas barrier performance even after hot water treatment and can exhibit an improved melt-kneading property. In particular, the patent document 2 discloses in Table 3 and Table 4 that a resin composition containing partially or completely dehydrated magnesium sulfate hydrate showed a behavior decreasing viscosity compared to initial viscosity in melt viscosity behavior at 230° C. with time, and that the resin composition exhibited an excellent gas barrier performance even after hot water treatment, respectively.

PRIOR ART

Patent Document

[patent document 1] JP2010-59418A
[patent document 2] JP2011-225800A

SUMMARY OF THE INVENTION

Technical Problem to be Solved by the Invention

The recent development of multilayer forming apparatus leads to expand use of a molded article of EVOH resin composition produced not only with a coextrusion molding machine which was mainly used in the past but also with a coinjection molding machine. A molding material applied to a coinjection molding process needs to have higher fluidity than a material applied to extrusion molding process because the former molding material is injected into a mold at high pressure. Therefore, when an EVOH resin composition is applied to a coinjection molding, the EVOH resin composition should be generally melt kneaded, plasticized, and transferred at a temperature of 250° C. or higher.

However, the resin composition disclosed in the patent documents 1 and 2 can exhibit excellent long-run stability at 230° C., which is a temperature commonly employed for the coextrusion molding. While, if the resin composition does not have a sufficient heat resistance, the resin composition may decompose partially under a condition of high temperature selected from the range of 250° C. to 280° C. and resulting in a molded article having blowholes therein. A higher temperature may make the resin composition increase in its viscosity due to densification of its network structure. As a result, the fluidity of the resin composition is decreased and the long-run stability would fall to a low level.

Under these situations, the present invention has been completed. The object of the invention is to provide a resin composition securing gas barrier performance even after hot water treatment such as retort treatment and having a long-run stability in a process conducted at a higher temperature while suppressing decomposition and foaming of the resin composition during the process.

Means for Solving the Problems

The present inventors have studied with focusing on thermal decomposition of a resin composition containing EVOH resin (A), polyamide-based resin (B), and a drying agent (C). And the inventors have found that when the reduction in weight of resin composition under high temperatures is larger than that of the conventional one, an excellent gas-barrier performance can be secured even after hot water treatment while decomposition and foaming in a process at a high temperature can be suppressed and long-run stability during the process can be also imparted. Thus the present invention has been completed.

A resin composition of the invention comprises EVOH resin (A), a polyamide-based resin (B), and a drying agent (C), wherein the reduction in weight of the resin composition after being kept at 250° C. in nitrogen atmosphere for 1 hour is 5% by weight or more but 35% by weight or less.

In a preferable embodiment, the resin composition further comprises a basic metal salt (D). The basic metal salt excludes a metal salt included in the drying agent (C). Preferably, the basic metal salt (D) is a metal salt of carboxylic acid having from 12 to 30 carbon atoms, and has a melting point of 250° C. or less.

In a preferable embodiment, the content of the basic metal salt (D) in the resin composition is from 40 to 2000 ppm in terms of as a metal content. In the case that the basic metal salt (D) is magnesium salt, the content of the basic metal salt (D) in the resin composition is preferably in the range of 40 to 350 ppm in terms of magnesium.

Preferably, the drying agent (C) is a hydrate-forming metal salt, and more preferably the drying agent (C) has a melting point of 300° C. or higher.

A multilayer structure of the invention comprises at least one layer of a resin composition of the invention.

In another aspect, the present invention provide a method of improving long-run stability of a resin composition. The method is a method of improving long-run stability of a resin composition in a process of extrusion molding or injection molding carried out at a temperature higher than 250° C., wherein the resin composition comprises (A) a saponified ethylene-vinyl ester-based copolymer, (B) a polyamide-based resin, and a drying agent (C). The method comprises adjusting a reduction in weight of the resin composition after being kept at 250° C. in nitrogen atmosphere for 1 hour.

In a preferable method, the content by percentage of the metal of the basic metal salt (D) is adjusted to 40 to 2000 ppm based on the resin composition, thereby adjusting the reduction in weight of the resin composition to 5% by weight or more but 35% by weight or less.

Effect of the Invention

The resin composition of the present invention can secure an excellent gas barrier performance even after a hot water treatment while the resin composition exhibits a long-run stability, and suppresses its decomposition and foaming at a high temperature. Therefore, the resin composition of the invention is useful for coextrusion molding or coinjection molding with another thermoplastic resin and the like molding or forming at a high temperature.

MODES FOR CARRYING OUT THE INVENTION

Hereinafter, the present invention will be described in detail, but the description is about merely one embodiment and it will be understood that we do not intend to limit the invention to the embodiment.
<Resin Composition>

A resin composition of the invention comprises an EVOH resin (A), a polyamide-based resin(B), and a drying agent (C), wherein the reduction in weight of the resin composition after being kept at 250° C. in a nitrogen atmosphere for 1 hour is 5% by weight or more but 35% by weight or less.

Next, the components will be described in order.
[(A) EVOH Resin]

EVOH resin used in the invention is a water-insoluble thermoplastic resin, which is commonly produced by saponifying a copolymer of ethylene and vinyl ester-based monomer.

The vinyl ester-based monomer typically used is vinyl acetate because of commercial availability and easiness in removing impurities in its production. Any known copolymerization method such as solution polymerization, suspension polymerization, and emulsion polymerization may be employed. In general, a solution polymerization using a solvent of a lower alcohol such as methanol is employed for the copolymerization. The saponification of the obtained ethylene-vinyl ester copolymer may be conducted by any known method.

Thus produced EVOH resin contains ethylene-derived structural unit and vinyl alcohol structural unit as main units, and optionally contains a small amount of vinyl ester structural unit which remains unsaponified.

Examples of vinyl ester-based monomers other than vinyl acetate include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate; and aromatic vinyl esters such as vinyl benzoate. As for an aliphatic vinyl ester, vinyl ester having usually from 3 to 20 carbon atoms, preferably 4 to 10 carbon atoms, particularly preferably 4 to 7 carbon atoms may be used. These vinyl esters may be used alone or in a combination thereof according to needs.

Ethylene as well as the above-mentioned vinyl ester-based monomer may be commonly obtained from a raw material derived from petroleum such as naphtha. Raw materials derived from natural gas such as shale gas, raw material derived from plants such as sugar or starch contained in sugar cane, sugar beet, corn, and potato, and defecated material derived from cellulose contained in rice, wheat, millet and other plant may be used as a raw material for those monomers.

The content of ethylene unit in the EVOH resin is in the range of usually 20 to 60 mol %, preferably 25 to 50 mol %, particularly preferably 25 to 35 mol %, as a measurement value in accordance with ISO14663. If the ethylene content is unduly low, the gas-barrier performance under a high humidity condition and melt-molding property tends to be lowered. If the ethylene content is unduly high, insufficient gas-barrier performance might be provided.

The saponification degree of the vinyl ester component in the EVOH resin is in the range of usually 90 to 100 mol %, preferably 95 to 100 mol %, particularly preferably 99 to 100 mol %, as a measurement value in accordance with JIS K6726 with the proviso that EVOH resin is dissolved homogenously in water/methanol solvent. If the saponification degree is unduly low, the gas-barrier performance, thermostability, and humidity resistance tend to be lowered.

Melt flow rate (MFR) of the EVOH resin at 210° C. under a load of 2,160 g is usually from 0.5 to 100 g/10 min., preferably from 1 to 50 g/10 min., particularly preferably from 3 to 35 g/10 min. If the EVOH resin has unduly high MFR, the EVOH resin tends to become unstable in film production. If the EVOH resin has unduly low MFR, the EVOH resin tends to have difficulty in melt-extruding due to relatively high viscosity.

The EVOH resin used in the invention may further contain a structural unit derived from the following comonomer in the range not inhibiting the effect of the invention, for example 10 mol % or less.

Examples of the comonomer include olefins such as propylene, 1-butene and isobutene; hydroxy group-containing α-olefins such as 3-buten-1-ol, 3-butene-1,2-diol, 4-penten-1-ol, and 5-hexene-1,2-diol, or a derivative such as ester thereof and acylated product; unsaturated acids such as acrylic acid, methacrylic acid, crotonic acid, phthalic acid (or anhydride), maleic acid (or anhydride), itaconic acid (or anhydride) or salt thereof, or mono- or di-alkyl ester having from 1 to 18 carbon atoms in the alkyl group; acrylamides such as acrylamide, N-alkyl acrylamide having from 1 to 18 carbon atoms in the alkyl group, N,N-dimethylacrylamide, 2-acrylamide propanesulfonic acid or salt thereof, acrylamide propyl dimethylamine or salt thereof or quaternary salt thereof; methacrylamides such as methacrylamide, N-alkylmethacrylamide having from 1 to 18 carbon atoms in the alkyl group, N,N-dimethylmethacrylamide, 2-methacrylamide propanesulfonic acid or salt thereof, methacrylamide propyl dimethylamine or salt thereof or quaternary salt thereof, N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether having from 1 to 18 carbon atoms in respective alkyl group; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol, and dimethoxy allyl alcohol; trimethyl-(3-acrylamide-3-dimethylpropyl)-ammonium chloride, acrylamide-2-methylpropanesulfonic acid and so on.

In addition, post-modified EVOH resins by urethanation, acetalization, cyanoethylation, or oxyalkylenation may be used.

In particular, an EVOH resin obtained by copolymerizing hydroxy group-containing α-olefins, especially EVOH resin having 1,2-diol in a side chain thereof is preferred, from the viewpoint of secondary moldability.

The EVOH resin having 1,2-diol in a side chain thereof contains 1,2-diol structural unit in a side chain as shown in the structural unit (1) below.

[formula 1]

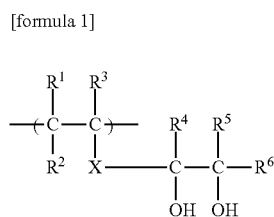

(1)

In the formula (1), $R^1$, $R^2$, and $R^3$ represent hydrogen atom or an organic group independently, and X represents single bond or a binding chain, and $R^4$, $R^5$, and $R^6$ represent hydrogen atom or an organic group independently.

Non-limiting examples of the organic group in the 1,2-diol structural unit of the formula (1) include saturated hydrocarbon group such as methyl, ethyl, n-propyl, isopropyl, n-butyl, isobutyl, and tert-butyl; aromatic hydrocarbon group such as phenyl and benzyl group; halogen, hydroxyl, acyloxy, alkoxycarbonyl, carboxyl, sulfonic acid group, and so on.

$R^1$ to $R^3$ each is a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred. $R^4$ to $R^6$ each is an alkyl group having from usually 1 to 30 carbon atoms, preferably 1 to 15 carbon atoms, further preferably 1 to 4 carbon atoms, or hydrogen atom. Of these, hydrogen atom is most preferred. In particular, it is most preferred that all of $R^1$ to $R^6$ are hydrogens.

X in the structural unit of the formula (1) is typically single bond.

X may be a binding chain unless the effect of the invention is inhibited. Non-limiting examples of the binding chain include hydrocarbon chain such as alkylene, alkenylene, alkynylene, phenylene, and naphthylene (wherein these hydrocarbons may be substituted with halogen such as fluorine, chlorine, or bromine), as well as ether bond-containing group such as —O—, —($CH_2$O)m-, —(O$CH_2$)m-, and —($CH_2$O)m$CH_2$-; carbonyl group containing chain such as —CO—, —COCO—, —CO($CH_2$)mCo-, and —CO($C_6H_4$)CO—; sulfur atom-containing group such as —S—, —CS—, —SO—, and —$SO_2$—; nitrogen atom-containing group such as —NR—, —CONR—, —NRCO—, —CSNR—, —NRCS—, and —NRNR—; hetero such as phosphorus atom-containing group such as —$HPO_4$—; silicon atom-containing group such as —Si(OR)$_2$—, —OSi(OR)$_2$—, and —OSi(OR)$_2$O—; titanium atom-containing group such as —Ti(OR)$_2$—, —OTi(OR)$_2$—, and —OTi(OR)$_2$O—; aluminum-containing group such as —Al(OR)—, —OAl(OR)—, and —OAl(OR)O—, wherein R is independently a substituting group, and preferably hydrogen atom or an alkyl group, m is a natural number selected from usually 1 to 30, preferably 1 to 15, particularly preferably 1 to 10. Among them, —$CH_2$O$CH_2$—, and hydrocarbon chain having from 1 to 10 carbon atoms are preferred from the viewpoint of stability in production and usage. Hydrocarbon chain having from 1 to 6 carbon atoms, especially 1 carbon atom is particularly preferred.

The most preferable structure of 1,2-diol structural unit represented by the formula (1) is a structure where all $R^1$ to $R^6$ are hydrogen atoms and X is single bond, that is the structural unit of the formula (1a) below.

[Formula 1a]

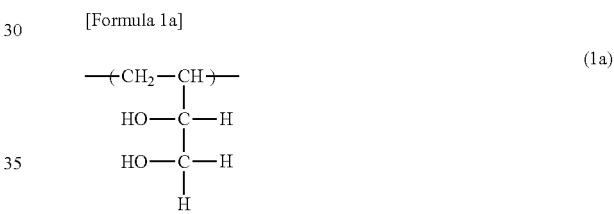

(1a)

In the case of containing 1,2-diol structural unit of the formula (1), the content of the structural unit is in the range of usually 0.1 to 20 mol %, preferably 0.1 to 15 mol %, particularly 0.1 to 10 mol %.

A combination of different types of EVOH resins may be also employed in the invention. The combination includes EVOH resins differing in the content of ethylene structural unit, saponification degree, MFR degree, other unit derived from a comonomer, 1,2-diol content of the structural unit of the formula (1), and so on.

The EVOH resin used in the invention may contain, in the range not inhibiting the effect of the invention, a conventional additive for EVOH resin including, for example, heat stabilizer, antioxidant, antistatic agent, colorant, ultraviolet absorber, lubricant, plasticizer, light stabilizer, surfactant, antibacterial agent, antiblocking agent, fire retardant, cross-linking agent, curing agent, foaming agent, crystal forming agent, anti-fogging agent, biodegradable agent, silane coupling agent, oxygen scavenger and the like.

As the heat stabilizer, an organic acid such as acetic acid, propionic acid, butyric acid, lauric acid, stearic acid, oleic acid, or behenic acid; or an inorganic acid such as sulfuric acid, sulfurous acid, carbonic acid, phosphoric acid, or boric acid may be used for the purpose of improving thermal stability in melt-molding and other physical properties. Of these, acetic acid, phosphoric acid or boron compound such as boric acid is preferably used.

In the case of adding acetic acid, its amount is usually from 0.001 to 1 part by weight, preferably from 0.005 to 0.2 part by weight, particularly preferably from 0.010 to 0.1 part by weight, based on 100 parts of EVOH resin. If the amount of acetic acid is unduly low, sufficient effect of acetic acid would not be obtained. On the contrary, if the amount of acetic acid is unduly high, the production of film having uniformity tends to become difficult.

In the case of adding boron compound, its amount is usually from 0.001 to 1 part by weight, preferably from 0.002 to 0.2 part by weight, particularly preferably from 0.005 to 0.1 part by weight, in terms of weight of boron, based on 100 parts by weight of EVOH resin. The weight of boron is determined by ICP emission analysis after incineration of the boron compound. If the amount is unduly low, sufficient effect of boron compound would not be obtained. On the contrary, if the amount is unduly high, the production of film having uniformity tends to become difficult.

A process for adding the acetic acid, boron compound, or phosphoric acid or the like to EVOH resin is not particularly limited. Examples of the process are as follows: i) allowing porous precipitate of EVOH resin having a water content of 20 to 80% by weight to contact with an aqueous solution of the additional compound and contain the additional compound in the porous precipitate, followed by drying the resultant; ii) allowing homogenous EVOH resin solution (solvent:water/alcohol etc.) to contain additional compound, and extruding the resulting solution into coagulation bath in the form of strand, and cutting the formed strand to obtain pellets, followed by drying the pellets; iii) mixing EVOH resin with additional compound in a lump, and melt-kneading with extruder or a like apparatus; iv) neutralizing alkali such as sodium hydroxide and potassium hydroxide used in saponification process with organic acids such as acetic acid during the production of EVOH resin, and rinsing to adjust the content of residue organic acids such as acetic acid or its salt as a by-product.

The processes i) and ii), which are excellent in dispersibility of the additional compound, are preferred because these methods would notably provide the effect of the invention. The process iv) is appropriate in the case of adding organic acid or salt thereof.

[Polyamide-Based Resin (B)]

Polyamide-based resin (B) has amide bond active to OH group and/or ester group in EVOH resin. This can form a network structure, thereby preventing the elution of EVOH resin caused from a hot water treatment. For instance, if a multilayer structure comprising a layer of the resin composition containing a polyamide resin is used as a wrapping material for foods, elution of EVOH resin from the edge of the wrapping material caused by hot water treatment can be suppressed.

Any known polyamide-based resin may be used.

Specific examples of the polyamide-based resin include polycapramide (nylon 6), poly-ω-aminoheptanoic acid (nylon 7), poly-ω-aminononanoic acid (nylon 9), polyundecanamide (nylon 11), polylauryl lactam (nylon 12) and a like homopolymers. Examples of copolyamide-based resin include polyethylenediamine adipamide (nylon 26), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(octamethylene adipamide) (nylon 86), poly(decamethylene adipamide) (nylon 108), caprolactam/lauryl lactam copolymer (nylon 6/12), caprolactam/w-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610), ethylene ammonium adipate/hexamethylene diammonium adipate/hexamethylene diammonium sebacate copolymer (nylon 6/66/610), and a like aliphatic copolyamide; poly(hexamethylene isophthalamide), poly(hexamethylene terephthalamide), poly(metaxylylene adipamide), hexamethylene isophthalamide/terephthalamide copolymer, poly-p-phenylene terephthalamide, poly-p-phenylene-3,4'-diphenyl ether terephthalamide, and a like aromatic polyamide; amorphous polyamide, polyamide-based resin modified with aromatic amine such as methylenebenzylamine or metaxylenediamine; metaxylylene diammonium adipate and so on. Terminal-modified polyamide-based resin in which the aforementioned polyamide-based resin is modified at the terminal thereof may be included. The terminal-modified polyamide-based resin is preferably used.

A common terminal-modified polyamide-based resin is polyamide-based resin whose terminal is modified with hydrocarbon group having from 1 to 22 carbon atoms, and commercially available. In particular, a terminal-modified polyamide-based resin satisfying the following equation is preferably used, wherein [a] denotes the number of terminal COOH group, [b] denotes the number of terminal $CONR^{10}R^{20}$ group wherein $R^{10}$ represents a hydrocarbon group having from 1 to 22 carbon atoms and $R^{20}$ represents hydrogen atom or a hydrocarbon group having from 1 to 22 carbon atoms.

$$100 \times b/(a+b) \geq 5$$

A common terminal-modified polyamide-based resin is N-substituted amide where a carboxyl group of a common native polyamide-based resin is modified with terminal control agent, and has 5% or more modification rate based on the total number of carboxyl groups contained in the polyamide-based resin before the modification. The terminal-modified polyamide-based resin having unduly low modification rate has relatively many carboxyl groups, which react with EVOH resin during melt-molding to generate gel or the like matter, resulting in impaired appearance of the film as a product. The terminal-modified polyamide-based resin may be produced by a method disclosed in, for instance, JP8-19302B.

As the terminal control agent, amines capable of reacting with carboxyl group may be used for reducing the number of carboxyl group in the polyamide-based resin. The amine may be monosubstituted amine represented by $HNR^{10}R^{20}$ wherein $R^{20}$ is hydrogen atom or disubstituted amine represented by $HNR^{10}R^{20}$. $HNR^{10}R^{20}$ having an organic group for $R^{10}$ and/or $R^{20}$ may be a hydrocarbon group without carboxyl group, and may contain hydroxyl, amino, carbonyl, and other functional group within the content not inhibiting the effect of the invention. Aliphatic hydrocarbon group is preferred. Specifically, $R^{10}$ and $R^{20}$ each is a hydrocarbon group having from 1 to 22 carbon atoms, preferably from 5 to 20 carbon atoms, and $R^{10}$ and $R^{20}$ may be the same or different from each other.

A preferable terminal-modified polyamide-based resin contains small content of remaining unmodified carboxyl group at terminal. A quantified content of the unmodified terminal carboxyl group by preparing a solution of polyamide resin dissolved in benzyl alcohol and titrating the solution with 0.1 N sodium hydroxide aqueous solution is usually from 0 to 50 μeq, preferably from 0 to 30 μeq, particularly preferably from 0 to 25 μeq, based on 1 g of the polymer, in terms of molar equivalent per polymer 1 g. If the content of the unmodified terminal carboxyl group is unduly high, gel or the like matter appears and results in a film with inferior appearance and lowered retortability. Unduly low content of the unmodified terminal carboxyl group causes to lower productivity, however, the physical properties are not almost affected. Accordingly, unmodified terminal carboxyl group may be remained in such a small content of usually 5 to 50 µeq, preferably 10 to 30 µeq, particularly 15 to 25 µeq, per 1 g of the polymer.

Not only terminal carboxyl group, but also terminal $NH_2$ group in the unmodified polyamide-based resin is preferably modified with hydrocarbon group having from 1 to 22 carbon atoms. The terminal control agent used for this modification is carboxylic acid capable of reacting with amino group for reducing the number of amino groups contained in the polyamide-based resin. The carboxylic acid may be monocarboxylic acid represented by RCOOH wherein R is a hydrocarbon group having from 1 to 22 carbon atoms.

Such terminal-modified polyamide-based resin has a melting point of usually 200 to 250° C., preferably 200 to 230° C.

[Drying Agent (C)]

The resin composition of the invention contains a drying agent (C), which is a feature of the invention. A generally known hygroscopic compound or water-soluble drying agent is used for the drying agent (C). Preferably water-soluble drying agent, more preferably hydrate-forming metal salt, is used. The water-soluble drying agent, in particular hydrate-forming metal salt can trap water molecule as crystallization water. Therefore, in the case of employing the water-soluble drying agent, in particular hydrate-forming metal salt for the drying agent, moisture coming into the resin composition layer during the hot water treatment is supposed to be absorbed as crystallization water of the drying agent. This could protect hydrogen bonds formed in EVOH resin contained in the resin composition layer against their ruin, as a result, depression of the gas-barrier performance of the layer could be suppressed.

Examples of the hygroscopic compound include silica gel, bentonite, molecular sieve, superabsorbent polymer and so on.

Examples of the water-soluble drying agent include sodium chloride, sodium nitrate, sugar, trilithium phosphate, sodium metaphosphate, sodium polyphosphate and a variety of hydrate-forming metal salts.

Hydrate-forming metal salt used for the invention is a salt capable of absorbing moisture for crystallization water. A method of producing the hydrate-forming metal salt is not limited, but a hydrate-forming metal salt is obtained by, for example, synthesizing hydrate, followed by drying and dehydration. A completely dehydrated and dry compound (anhydride) is preferred from the viewpoint of hygroscopicity, but a partially dehydrated compound, in other words, a hydrate containing water less than saturated amount may also be used.

As a metal for the hydrate-forming metal salt, monovalent, divalent, or trivalent metal may be used. Monovalent metal includes alkali metal such as sodium and potassium. Divalent metal includes alkaline earth metal such as beryllium, magnesium, and calcium, and transition metal forming divalent ion such as copper, zinc, and iron. Trivalent metal includes aluminum and iron. Among them, sodium and magnesium are preferred, magnesium is more preferred.

Acid as a constituent of the hydrate-forming metal salt includes sulfuric acid, carboxylic acid, phosphoric acid, boric acid, nitric acid, carbonic acid, sulfurous acid, and the like. Of these, sulfuric acid, carboxylic acid, and phosphoric acid are preferred, and sulfuric acid and carboxylic acid are particularly preferred.

Non-limiting specific examples of hydrate-forming metal salt include chlorides such as cobalt chloride, calcium chloride, and magnesium chloride; phosphates such as monosodium dihydrogen phosphate, disodium monohydrogen phosphate, trisodium phosphate, sodium pyrophosphate, and calcium hydrogen phosphate; carboxylates such as disodium succinate, sodium tartrate, trisodium citrate, and trimagnesium dicitrate; sulfates such as sodium sulfate, potassium sulfate, and magnesium sulfate. Of these, sulfate, succinate, or citrate is preferably used, in particular, partially or completely dehydrated magnesium sulfate and trimagnesium dicitrate, from the viewpoint of recovery of gas-barrier performance after the retort treatment.

The aforementioned hydrate-forming metal salt absorbs moisture to form hydrate having crystallization water. Metal sulfate containing crystallization water include, for instance, monovalent metal salt such as sodium sulfate ($Na_2SO_4.10H_2O$) and potassium sulfate ($K_2SO_4.1H_2O$); alkaline earth metal salt such as beryllium sulfate ($BeSO_4.4H_2O$), magnesium sulfate ($MgSO_4.7H_2O$), and calcium sulfate ($CaSO_4.2H_2O$); transition metal salt such as copper sulfate ($CuSO_4).5H_2O$), zinc sulfate ($ZnSO_4.7H_2O$), and iron sulfate ($FeSO_4.7H_2O$); aluminum sulfate ($Al_2(SO_4)_3.16H_2O$) and so on.

Carboxylate hydrate containing crystallization water include, for instance, monocarboxylates such as acetates such as sodium acetate ($CH_3COONa.3H_2O$) and calcium acetate (($CH_3COO)_2Ca.H_2O$), lactates such as calcium lactate (($CH_3CH(OH)COO)_2Ca.5H_2O$), gluconates such as zinc gluconate (($CH_2(OH)CH(OH)CH(OH)CH(OH)CH(OH)COO)_2Zn.3H_2O$) and calcium gluconate (($CH_2(OH)CH(OH)CH(OH)CH(OH)CH(OH)COO)_2Ca.H_2O$), and benzonates such as magnesium benzoate (($C_6H_5COO)_2Mg.4H_2O$) and calcium benzoate (($C_6H_5COO)_2Ca.3H_2O$); dicarboxylates such as malates such as sodium malate ($NaOOCCH(OH)CH_2COONa).3H_2O$) and calcium malate ($OOCCH(OH)CH_2COO)Ca.H_2O$), oxalate such as potassium oxalate (($COONa)_2.H_2O$) and ammonium oxalate (($COONH_4)_2.H_2O$), succinates such as disodium succinate (($CH_2COONa)_2.6H_2O$) and dipotassium succinate (($CH_2COOK)_2.3H_2O$), glutamates such as potassium L-hydrogenglutamate ($HOOCCH(NH_2)CH_2CH_2COOK.H_2O$), sodium L-hydrogenglutamate ($HOOCCH(NH_2)CH_2CH_2COONa.H_2O$) and magnesium L-glutamate (($OOCCH(NH_2)CH_2CH_2COO)Mg.4H_2O$), aspartates such as sodium L-aspartate ($HOOCCH_2CH(COOH)NH_2.H_2O$), and tartarates such as sodium L-hydrogentartarate ($HOOCCH(OH)CH(OH)COONa.H_2O$) and disodium L-tartarate ($NaOCOCH(OH)CH(OH)COONa.2H_2O$); tricarboxylates such as tripotassium citrate ($KOCOCH_2C(OH)(COOK)CH_2COOK.H_2O$), trisodium citrate(($C_3H_5O(COO)_3)Na_3.2H_2O$), trimagnesium dicitrate (($C_3H_5O(COO)_3)_2Mg_3.14H_2O$), and tricalcium dicitrate (($C_3HsO(COO)_3)_2Ca_3.4H_2O$); tetracarboxylates such as EDTA carboxylates such as EDTA acetate such as disodium calcium ethylenediamine tetraacetic acid ($Ca(OOCCH_2)_2NCH_2CH_2N(CH_2COONa)_2.2H_2O$) and disodium ethylenediamine tetraacetic acid (($HOOCCH_2)_2NCH_2CH_2N(CH_2COONa)_2.2H_2O$).

The chemical formula noted in brackets represent saturated hydrate of the respective metal salt.

The drying agent employs a partially or completely dehydrated compound capable of forming an above-mentioned hydrate. The partially dehydrated compound corresponds to a dehydrated metal salt hydrate where a part of crystallization water is removed from the saturated hydrate, and has usually crystallization water less than 90% by weight based on the total weight of the crystallization water of saturated hydrate thereof. A partially dehydrated compound is preferably used because the partially dehydrated one can be converted into a saturated hydrate one which is more stable than the partially dehydrated one at a normal temperature. For this reason, a hydrate containing crystallization water less than 70% based on saturated hydrate is preferred, completely dehydrated compound is more preferred.

According to the invention, the drying agent (C) preferably has a melting point of 300° C. or higher because of the effect of water absorption. If the drying agent has an unduly low melting point, the function of the drying agent may be impaired after melt-molding.

The content ratio (A/B) of the EVOH resin (A) to the polyamide-based resin (B) is usually from 99/1 to 70/30, preferably 97/3 to 75/25, particularly preferably 95/5 to 85/15. Unduly high content of polyamide-based resin tends to lower long-run stability and gas-barrier performance of the drying agent. Unduly low content of the polyamide-based resin tends to lower the suppression of elution of EVOH resin after hot water treatment.

The weight ratio of the base resin (total weight of EVOH resin (A) and polyamide-based resin (B)) to drying agent (C), i.e. ((A+B)/C), is preferably from more than 50/less than 50 to 99/1, more preferably from 70/30 to 99/1, further more preferably from 80/20 to 95/5, particularly preferably from 85/15 to 95/5. In the case that the drying agent (C) is a partially dehydrated metal salt which still keeps crystallization water, the weight of completely dehydrated metal salt is employed for the weight (C) in ((A+B)/C).

If the content of the drying agent (C) is unduly high, transparency might be impaired or screen mesh in the molding machine might be blocked during molding due to agglomeration of the drying agent. If the content of the drying agent (C) is unduly low, moisture which has been entering might not be satisfactorily trapped, resulting in lowering gas barrier performance after hot water treatment such as boiling treatment or retort treatment.

The ratio in weight of drying agent (C) to polyamide-based resin (B), i.e. (C/B), is from usually 95/5 to 5/95, preferably 70/30 to 30/70, particularly preferably 60/40 to 40/60. The weight of the drying agent (C) employs one of the completely dehydrated compound. If the content of the polyamide-based resin is unduly high, the gas-barrier performance tends to be lowered after the hot water treatment. If the content of the polyamide-based resin is unduly low, EVOH resin is likely to elute during a hot water treatment.

[Basic Metal Salt (D)]

The resin composition of the invention preferably contain a basic metal salt (D) in addition to the EVOH resin (A), polyamide-based resin (B) and drying agent (C). The basic metal salt (D) excludes a metal salt included in the drying agent (C). The basic metal salt can bring the resin composition to satisfy that the reduction in weight of the resin composition after being kept at 250° C. in a nitrogen atmosphere for 1 hour is 5% by weight or more but 35% by weight or less, which could identify a thermal stability of the resin composition of the invention.

According to Bronsted-Lowry's theory, a basic metal salt (D) is a compound which act as proton acceptor, and includes, for instance, (1) metal salt made from alkali metal or alkaline earth metal and weak acid (e.g. carboxylic acid having from 12 to 30 carbon atoms or carbonic acid etc.) and having acid dissociation constant pKa above 3 as determined in its aqueous solution at 25° C., and (2) metal salt made from a transition metal and weak acid (e.g. carboxylic acid having from 12 to 30 carbon atoms or carbonic acid etc.) and having acid dissociation constant pKa above 3 as determined in its aqueous solution at 25° C. Specific examples of these will be listed below.

(I) metal salt made from alkali metal or alkaline earth metal and weak acid and having acid dissociation constant pKa above 3 as determined in its aqueous solution at 25° C.

sodium salt (sodium stearate, sodium 12-hydroxystearate, sodium laurate, sodium behenate, sodium montanate, and sodium carbonate etc.)

potassium salt (potassium stearate, potassium laurate, potassium montanate, and potassium carbonate etc.)

magnesium salt (magnesium stearate, magnesium 12-hydroxystearate, magnesium laurate, magnesium behenate, magnesium montanate, and magnesium carbonate etc.)

calcium salt (calcium stearate, calcium 12-hydroxystearate, calcium laurate, calcium behenate, calcium montanate, and calcium carbonate etc.)

(II) metal salt made from a transition metal and weak acid and having acid dissociation constant pKa above 3 as determined in its aqueous solution at 25° C.

zinc salt (zinc stearate, zinc 12-hydroxystearate, zinc laurate, zinc behenate, and zinc montanate etc.)

barium salt (barium stearate, barium 12-hydroxystearate, and barium laurate etc.)

aluminum salt (aluminum stearate, and aluminum 12-hydroxystearate etc.)

lithium salt (lithium stearate, lithium 12-hydroxy stearate, lithium laurate, lithium behenate, and lithium montanate)

Preferably, the basic metal salt (D) used in the invention has a melting point of 250° C. or lower, particularly from 120 to 240° C., more particularly from 140 to 230° C., from the viewpoint of melt-molding stability. Unduly high melting point of the basic metal salt tends to lower long-run stability of the resin composition.

Preferably, the weak acid has an acid dissociation constant pKa of 3 to 6 as determined in its aqueous solution at 25° C. Specific examples of the weak acid include a metal salt of carboxylic acid having from 12 to 30 carbon atoms (i.e. higher fatty acid). A preferable basic metal salt (D) is a magnesium salt. A magnesium salt of higher fatty acid is most preferable because even a tiny amount of it can impart an excellent thermal stability, which is advantageous in adjusting the content for long-run stability.

These basic metal salts (D) each is commonly used alone but also may be used in a combination of two or more of them.

A specific metal soap represented by the formula below, which is obtained by heating and reacting one or more of aliphatic monocarboxylic acid having from 12 to 30 carbon atoms with an oxide or hydroxide of group 2 in the periodic table by dry directing method, may be used because of long-run stability. In the below formula, a represents a numeral selected from 0.1 to 1.0, M represents divalent metal of the group 2 in the periodic table, and R represents a saturated or unsaturated alkyl group having from 11 to 29 carbon atoms.

The above-mentioned basic metal salt (D) can be molten at a temperature employed in a process of melt-kneading of EVOH resin (A) and polyamide-based resin(B), commonly 300° C. or lower, and act as a basic compound in its molten state. Accordingly, in the case of melt-molding of a resin composition containing such a basic metal salt (D), the basic metal salt (D) is molten to neutralize an acidic metal salt used as a drying agent (C). This can provide unstable EVOH resin in acidic condition with a stable condition for the EVOH resin. As a result, the melt-molding stability of the resin composition is improved.

A hydrate-forming metal salt used as the drying agent (C) may be included in the basic metal salt, however, the basic metal salt (D) excludes a basic metal salt included in the drying agent (C). The basic metal salt having a melting point of 250° C. or lower and a metal salt of carboxylic acid having from 12 to 30 carbon atoms, both of which are preferable basic metal salts (D). These basic metal salts can be molten during the processes of melt-kneading and melt-molding of the resin composition, because these processes are conducted at a temperature between 200° C. and 300° C. While a basic metal salt used as the component (C) cannot be molten and still exist in a state of solid during the processes. Therefore the basic metal salt (D) is distinct from the drying agent (C).

A specific amount of the basic metal salt (D) contained in the resin composition can suppress decomposition and foaming of the EVOH resin composition in melt-kneading or melt-molding process of the resin composition because the basic metal salt (D) can be molten under such higher temperatures. Moreover, the molten basic metal salt (D) can make a role of lubricant for drying agent which is present still in the state of solid, and thereby suppressing increase of viscosity of the resin composition. In other words, although the drying agent (C) causes the increase of the viscosity of the resin composition as well as the increase of torque in the mixing process, the basic metal salt (D) can suppress the increase of the viscosity of the resin composition and give an excellent long-run stability. In a similar way, although the polyamide-based resin in the resin composition which is added for avoiding the elution of the EVOH resin makes the torque in the mixing process of the resin composition increase, the basic metal salt (D) can suppress the increase of the viscosity.

The effect of the basic metal salt (D), which is suppression of the viscosity increase of the resin composition containing EVOH resin and imparts an excellent long-run stability, can be obtained even in the presence of polyamide-based resin. This means that effect of the basic metal salt (D) is obtained while the effect of avoiding the elution of the EVOH resin by the polyamide-based resin is secured, which is a significant advantage.

The content of the basic metal salt (D) in the resin composition ranges from usually 40 to 2000 ppm, preferably 50 to 1000 ppm, particularly preferably 80 to 500 ppm, in terms of the metal content of the basic metal salt (D). Unduly low content of the basic metal salt is likely to decrease the long-run stability in melt-molding process at higher temperatures, which might generate fish eye and/or gel during melt-molding at higher temperatures for long hours. On the contrary, unduly high content of the basic metal salt can promote the decomposition of the EVOH resin during the melt-molding at higher temperatures, resulting in a defective molded article due to foaming and the like. In the case of employing a magnesium salt for the basic metal salt (D), the necessary amount is smaller than the other basic metal salt because of its excellent thermostability. The amount of the magnesium salt is from usually 40 to 350 ppm, preferably 50 to 300 ppm, particularly preferably 80 to 250 ppm, in the term of the magnesium content.

The content of the basic metal salt (D) contained in the resin composition is determined as a metal content by ICP emission analysis after incineration of EVOH resin composition with sulfuric acid in the case that alkali metal or alkaline earth metal is used for the basic metal salt (D). When the basic metal salt (D) is in common with other additive as described later, the determined content of the metal is treated as the content of the metal derived from the basic metal salt (D).

[Other Additive (E)]

If necessary, the EVOH resin composition of the invention may contain the following compound as an other additive (E).

In the case of containing other additives, the amount should be within not impairing the effect of the invention, for example, usually 10% by weight or less, preferably 5% by weight or less including 0% by weight, based on the total weight of the resin composition, The other additive (E) includes a thermoplastic resin other than the EVOH resin (A) (hereinafter, called as "other thermoplastic resin"), dispersing agent, planer inorganic filler, oxygen scavenger and so on. Moreover, the other additive (E) may include, for instance, plasticizer such as ethylene glycol, glycerin, hexanediol, and a like aliphatic polyalcohol; lubricant such as saturated aliphatic amide (e.g. stearamide), unsaturated fatty acid amide (e.g. amide oleate), bis-fatty acid amide (e.g. ethylene bis stearamide), and low molecular weight polyolefin (e.g. low molecular weight polyethylene or low molecular weight polypropylene, both having a molecular weight of 500 to 10000); antiblocking agent; antioxidant; colorant; antistatic agent; ultraviolet absorber; antibacterial agent; insoluble inorganic salt (e.g. hydrotalcite); filler (e.g. inorganic filler); surfactant, wax; conjugated polyene compound, ene diol group-containing substance (e.g. phenols such as propyl gallate), and aldehyde compound (e.g. unsaturated aldehydes such as crotonaldehyde), and the like known additives.

Examples of the other thermoplastic resin include homo- or co-polymer of olefins such as linear low density polyethylene, low density polyethylene, medium density polyethylene, high density polyethylene, ethylene-vinyl acetate copolymer, ionomer, ethylene-propylene copolymer, ethylene-α-olefin (having from 4 to 20 carbon atoms) copolymer, ethylene-acrylate copolymer, polypropylene, propylene-α-olefin (having from 4 to 20 carbon atoms) copolymer, polybutene, and polypentene; polycyclic olefin, or graft modified thereof in which these homo- or copolymer is graft modified with unsaturated carboxylic acid or ester thereof, and other polyolefin-based resins in a broad sense; polystyrene-based resin, polyester, polyamide, copolyamide, polyvinyl chloride, polyvinylidene chloride, acryl-based resin, vinyl ester-based resin, polyester-based elastomer, polyurethane-based elastomer, polystyrene-based elastomer, chlorinated polyethylene, chlorinated polypropylene, and other thermoplastic resin.

A typical raw material of the other thermoplastic resin includes naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for the other thermoplastic resin.

As for the dispersing agent, any one conventionally used in a resin composition may be used. Examples of the dispersing agent include higher fatty acid (e.g. lauric acid, myristic acid, palmitic acid, stearic acid, behenic acid, oleic acid), higher fatty acid ester (e.g. glyceride, methyl ester, isopropyl ester, butyl ester, octyl ester of higher fatty acid), higher fatty acid amide (e.g saturated aliphatic amide such as stearamide and behenamide, unsaturated fatty acid amide such as oleamide and erucamide, and bis-fatty acid amide such as ethylene bis stearamide, ethylene bis oleamide, ethylene bis erucamide, and ethylene bis lauramide), low molecular weight polyolefin (e.g. low molecular weight polyethylene or low molecular weight polypropylene, both having molecular weight of 500 to 10,000, and its acid-modified product), higher alcohol, ester oligomer, fluorinated ethylene resin, and so on. Among them, higher fatty acid and/or its ester or amide is preferably used, and higher fatty acid glyceride is more preferably used.

Examples of the plate-like inorganic filler include kaolin, mica, smectite, talc, and so on. Kaolin is a plate-like particle of hydrous aluminum silicate as a main component. Mica and smectite are layered silicic acid mineral. Talc consists of magnesium hydroxide and silicate. A preferable plate-like inorganic filler is kaolin. Types of kaolin and calcination are not limited, but calcined kaolin is preferred.

These plate-like inorganic fillers can further improve gas-barrier performance of the resin composition. Since the plate-like inorganic filler has a layered structure, completely or partially dehydrated hydrate used as a drying agent can intrude between layers of the plate-like inorganic filler during kneading. This can avoid destruction or fragmentation of the plate-like inorganic filler upon contacting or colliding. In addition, the plate-like inorganic filler is easy to be oriented in planar direction in film production. The plate-like inorganic filler oriented in planar direction is effective for blocking oxygen entry into a resin composition layer.

The oxygen scavenger is a compound or composite which traps oxygen faster than the packaged substance. Specifically, the oxygen scavenger includes inorganic-based oxygen scavenger, organic oxygen scavenger, and composite type oxygen scavenger which is an assembly of inorganic catalyst and organic compound.

The inorganic-based oxygen scavenger includes metal and metal compound, which trap oxygen through the reaction with oxygen. A metal which has an ionization tendency larger than hydrogen, such as Fe, Zn, Mg, Al, K, Ca, Ni, and Sn is preferably used for metal for inorganic-based oxygen scavenger. Iron is typically used. Powdered metal is preferably used. Iron powder includes reduced iron powder, atomized iron powder, electrolyte iron powder, and the like.

Conventionally known iron powder may be used without depending on its production method.

An oxidized iron is reduced to be utilized for oxygen scavenger. Oxygen-defective type metal compound is also used. Examples of oxygen-defective type metal compound include cerium oxide ($CeO_2$), titanium oxide ($TiO_2$), zinc oxide (ZnO) and so on, from which oxygen are abstracted through reduction to become oxygen-defective state. A substance in such oxygen-defective state absorbs oxygen through the reaction with oxygen in air. These metals and metal compounds may be used together with a reaction accelerator such as metal halide and the like.

Examples of the organic oxygen scavenger include hydroxyl group-containing compound, quinone-based compound, double bond-containing compound, and easily oxidizable resin. These compounds contain hydroxyl group or double bond, which reacts with oxygen, thereby eliminating oxygen. Preferable organic oxygen scavenger includes ring-opened polymer of cycloalkane such as polyoctenylene, polyconjugated diene such as butadiene polymer or cyclized product thereof.

Composite type oxygen scavenger is a combination of transition metal catalyst and organic compound. The transition metal catalyst excites oxygen and allows the organic compound to react with oxygen, thereby eliminating oxygen. The organic compound in the composite type oxygen scavenger can react with oxygen faster than packaged substances such as food, as a result, the composite type oxygen scavenger traps oxygen which comes into the resin composition. Transition metal constituting the transition metal-based catalyst is selected at least one from the group consisting of titanium, vanadium, chromium, manganese, iron, cobalt, nickel, copper, zinc, zirconium, ruthenium, and palladium. Particularly, cobalt is preferred from the viewpoint of compatibility with resin, catalyst function, and safety. Preferable organic compound includes ring-opened polymer of cycloalkenes such as polyoctenylene, polymer of conjugated diene such as butadiene, and cyclized product thereof. Preferable other organic compound includes nitrogen-containing resin such as MXD nylon, tertiary hydrogen-containing resin such as polypropylene, polyalkylene ether bond-containing resin such as block copolymer having polyalkylene ether unit, and anthraquinone polymer.

Examples of the conjugated polyene compound include conjugated diene compound having two carbon-carbon double bonds such as isoprene, myrcene, farnesene, cembrene, sorbic acid, sorbic acid ester, sorbate, and abietic acid; conjugated triene compound having three double bonds such as 1,3,5-hexatriene, 2,4,6-octatriene-1-carboxylic acid, eleostearic acid, tung oil, and cholecalciferol; conjugated polyene compound having 4 or more double bonds such as cyclooctatetraene, 2,4,6,8-decatetraene-1-carboxylic acid, retinol, and retinoic acid. These conjugated polyene compounds may be used alone or in a combination of two types or more of them.

<Reduction Rate of Weight of Resin Composition>

The resin composition of the invention has features: the composition mentioned above and its reduction in weight of 5% by weight or more but 35% by weight or less. The reduction is a reduction in weight after the resin composition is kept at 250° C. in nitrogen atmosphere for 1 hour.

The reduction in weight is an indicator for thermal decomposition resistance in a processing at high temperatures and measured with a thermogravimetric analyzer. The reduction rate (% by weight) is calculated as a rate in weight before and after heating. The weight of the resin composition after being kept at 250° C. in nitrogen atmosphere for 1 hour is obtained as a measurement valued with a thermogravimetric analyzer The resin composition of the invention needs to satisfy the above-mentioned reduction rate in weight in order to suppress decomposition and foaming during the process at a relatively high temperature as well as secure long-run stability.

The reduction rate in weight is an indicator for thermal decomposition resistance at a specific temperature. The lower the reduction rate is, the less the amount of the generated decomposition gas is. Lower reduction rate indicates that the thermal decomposition resistance of the resin composition is excellent. On the contrary, the higher the reduction rate is, the more the amount of the generated decomposition gas is. Higher reduction rate indicates that the thermal decomposition resistance of the resin composition is insufficient.

The resin composition of the invention has a reduction rate is in the range of 5 to 35% by weight, preferably 7.5 to 25% by weight, particularly preferably 10 to 20% by weight, wherein the reduction rate is a rate in weight of the resin composition before and after being kept at 250° C. in nitrogen atmosphere for 1 hour. If the resin composition has an unduly low reduction rate, the long-run stability in the melt-molding operation at high temperatures is insufficient, resulting in generation of gel and/or fish eye during a continuous melt-molding for long hours. On the contrary, if the resin composition has an unduly high reduction rate, the thermal decomposition is accelerated in the melt-molding process at high temperatures, resulting in defective molded product due to foaming and so on.

With respect to the reduction in weight of resin composition after being kept at 250° C. in nitrogen atmosphere for 1 hour, the reduction can be adjusted to the range of 5% by weight or more but 35% by weight or less by the following:

(1) by adding a basic metal salt (D) to a composition containing EVOH resin (A), polyamide-based resin (B), and drying agent (C), and adjusting the content ratio of, for instance the metal of the basic metal salt, to a specific range;

(2) by adding a basic metal salt (D) to a composition containing EVOH resin (A), polyamide-based resin (B), and drying agent (C), and adjusting mixing conditions such as temperature and mixer;

(3) by adjusting a specific surface area (or particle size) of the drying agent (C) in a resin composition containing EVOH resin (A), polyamide-based resin (B), and drying agent (C); or (4) by blending a suitable kind of polyamide-based resin (B) or drying agent (C) when preparing a composition containing EVOH resin (A), polyamide-based resin (B), and drying agent(C), for example employing a combination of two or more of polyamide-based resins or drying agents differing from each other.

On these, the method (1) is preferably employed from the viewpoint of quality and/or production efficacy of the resin composition.

In the methods (1) and (2), the basic metal salt (D) can be molten and act as a basic compound during the process of melt-mixing EVOH resin (A) and polyamide-based resin (B), which is carried out at, usually 300° C. or less. This behavior of the basic metal salt (D) may improve melt-molding stability of the resin composition.

In short, with respect to the reduction in weight of a resin composition containing EVOH resin (A), polyamide-based resin (B), and drying agent (C) after being kept at 250° C. in nitrogen atmosphere for 1 hour, adjusting to the specific range of 5% by weight or more but 35% by weight or less can suppress thermal decomposition at a relatively high temperature as well as can improve long-run stability of the resin composition.

A most preferable method of adjusting the reduction in weight to the above-mentioned range is to blend a basic metal salt (D) at a concentration such that the metal content of the basic metal salt (D) in the resin composition is in the range of 40 to 2000 ppm, preferably 50 to 1000 ppm, particularly preferably 80 to 500 ppm. If the content is unduly low, the long-run stability during melt molding at high temperatures is lowered, resulting in an impaired molded product with increased fisheye and/or gel in a long-run production. Because thermal decomposition of the resin is promoted at unduly high temperature and causes a tendency of producing a defective molded article due to foaming and the like.

<Method of Preparing Resin Composition>

For mixing the drying agent (C) with the EVOH resin (A) and polyamide-based resin (B), melt-kneading operation or mechanical mixing operation (pellet dryblend) is typically employed, and melt-kneading operation is preferably employed. Specifically, the mixing operation is conducted by melting a mixture obtained by dryblending all components (A), (B) and (C), or by mixing a drying agent (C) with molten mixture of EVOH resin (A) and polyamide-based resin (B).

In the case that the resin composition contains a basic metal salt (D), the resin composition is prepared by (i) simultaneously blending all components (A), (B), (C), and (D); (ii) adding components (B) and (C) to a mixture previously prepared by homogenously mixing component (A) and component (D); (iii) adding components (A) and (B) to a mixture previously prepared by homogenously mixing component (C) and component (D); (iv) adding component (D) to a composition containing components (A), (B) and (C) which is prepared by homogenously mixing them; (v) adding component (C) to a composition containing components (A), (B) and (D) which is previously prepared by homogenously mixing them; or (vi) adding excessive amounts of the components (C) and (D) to a mixture of component (A) and component (B) to produce a masterbatch containing components (C) and (D) at a relatively high concentration, and decreasing the concentrations of components (C) and (D) by adding EVOH resin (A) or polyamide-based resin (B), thereby obtaining a composition having intended contents of the components (A), (B), (C), and (D) respectively.

The weight ratio of the total contents of EVOH resin (A) and polyamide-based resin (B) to the content of drying agent (C) in a masterbatch, [(A+B)/C)] in weight, is usually in the range between 10/90 and less than 50/more than 50.

The ratio in weight of the EVOH resin (A) to the masterbatch, (A/masterbatch) in weight, is usually in the range between 10/90 and 99/1, preferably between 20/80 and 95/5, particularly preferably between 30/70 and 90/10.

A mixture of components may be obtained by any blending method such as dry blending with a banbury mixer, melt-kneading with uniaxial or biaxial extruder, and then pelletizing. The melt-mixing is carried out at a temperature of usually 150 to 300° C., preferably 170 to 250° C.

In such melt-kneading operation executed at an above-mentioned temperature, the basic metal salt (D) is usually molten but the metal salt used as the drying agent (C) is not molten and still present in the state of solid.

A resin composition of the invention can be prepared by a method comprising immersing EVOH resin (A) and/or polyamide-based resin (B) into an aqueous solution of drying agent (C) to impregnate the resin(s) with the drying agent, followed by drying the resultant. However, this method (impregnating method) is hard to be employed because this impregnation may impair the hydrate-forming ability of the drying agent (C) in a molded article made from the resulting resin composition.

A resin composition of the invention can be also prepared by a method comprising adding a drying agent (C) to a mixture of EVOH resin (A) and polyamide-based resin (B) and melt-kneading, followed by evaporating the hydration water of the drying agent (C). However, the method is hard to be employed because foaming tends to occur in the resulting resin composition.

The resin composition of the invention which is prepared by melt-kneading raw materials may be directly supplied to a mold for a molded article. However, a preferable method of producing a molded article is conducted by pelletizing the resin composition after melt-kneading raw materials and supplying the obtained pellets to a melt molding machine from the viewpoint of industrial handleability. From the economic view, a preferable method of producing pellets of the resin composition comprises melt-kneading with an extruder, extruding the resin composition in a strand form, and cutting the strand.

The pellets may have a shape of sphere, circular cylinder, cube, cuboid and other like shape. The common shape is sphere or rugby ball-like shape, or circular cylinder. According to the convenience, the pellet size used as molding material is as follows: in the case of sphere, its diameter is usually between 1 and 6 mm, preferably between 2 and 5 mm, and in the case of circular cylinder, its diameter of the circular bottom is usually between 1 and 6 mm, preferably 2 and 5 mm, and its length is usually between 1 to 6 mm, preferably between 2 and 5 mm.

Adhering lubricant on a surface of the resin composition pellet is preferred for stabilizing the feeding property of the resin composition when melt-molded. As the lubricant, higher fatty acid (e.g. lauric acid, myristic acid, palmitic acid, stearic acid, behenic acid, oleic acid, and so on), higher fatty acid ester (e.g methyl ester, isopropyl ester, butyl ester, or octyl ester of higher fatty acid), higher fatty acid amide (e.g. saturated aliphatic amide such as stearamide and behenamide, unsaturated aliphatic amide such as oleamide and erucamide, bis-fatty acid amide such as ethylene bis stearamide, ethylene bis oleamide, ethylene bis erucamide, ethylene bis lauramide), low molecular weight polyolefin (e.g. low molecular weight polyethylene or low molecular weight polypropylene each having a molecular weight of 500 to 10,000, or its acid modified compound), higher alcohol, ester oligomer, fluorized ethylene resin. Higher fatty acid and/or ester, and amide thereof are preferred, and higher fatty acid metal salt and/or higher fatty acid amide is more preferred.

Any state of lubricant such as solid (e.g. microparticles, fine powder, flake etc.), semi-solid, liquid, paste, solution, emulsion (aqueous dispersion) and the like may be used. An emulsion of the lubricant is preferably used because of the efficiency of the production of desired pellets of the resin composition.

Adhering the lubricant to the surface of the resin composition pellet is achieved by, for example, mixing lubricant with resin composition pellet with a blender or the like apparatus; immersing resin composition pellets in a solution or dispersion of lubricant; or spraying a solution or dispersion of lubricant to resin composition pellets. Preferably, feeding resin composition pellets to a blender or a like apparatus, and gradually adding emulsion of lubricant under agitation, thereby achieving evenly adhering the lubricant to the surface of the resin composition pellet. The adding speed for achieving even adhesion is from 0.001 to 1 parts by weight/hr, preferably 0.01 to 0.1 parts by weight/hr in terms of the solid content of the lubricant added based on 100 parts by weight of the resin composition pellets. Particular preferable method is contacting lubricant with resin composition pellets each having a surface temperature between a temperature "(mp-50) ° C." and melting point (mp) of the lubricant. "(mp-50)" means a temperature 50° C. lower than the melting point (mp). This method can provide resin composition pellets coated with lubricant which stick so firmly not to release from the pellets in melt-molding apparatus.

The amount of the lubricant adhering to the pellet is selected from the range of 10 to 1000 ppm, preferably 20 to 500 ppm, particularly preferably 50 to 250 ppm, based on the resin composition pellet, from the viewpoint of stable feeding in melt-molding process.

<Melt-Molded Article>

The resin composition of the invention is formed into film, sheet, cup, bottle and so on through melt-molding. The melt-molding method includes extrusion molding process (T-die extrusion, tubular (blown) film extrusion, blow molding, melt spinning, contour extrusion etc.), injection molding process, and the like. The melt-molding temperature is selected from the range of usually 150 to 300° C.

A melt-molded article from the resin composition of the invention may be directly applicable to various applications. In this case, the layer of the resin composition has a thickness of usually 1 to 5000 µm, preferably 5 to 4000 µm, particularly preferably 10 to 3000 µm.

The layer of the resin composition is typically obtained by aforementioned melt-molding process. In a typical melt-molded article from the resin composition of the invention, the drying agent (C) is dispersed in the base resin corresponding to homogeneously mixed resins of EVOH resin (A) and polyamide-based resin (B).

<Multilayer Structure>

The multilayer structure of the invention comprises at least one layer of the resin composition of the invention. The layer containing a resin composition of the invention (hereinafter, simply called as "resin composition layer") is laminated over another substrate to improve strength of the multilayer structure or impart another function on the multilayer structure.

A preferable resin used for the substrate is a thermoplastic resin other than EVOH resin (hereinafter, called as "substrate resin").

The multilayer structure of the invention may employ a variety of layer arrangement, such as a/b, b/a/b, a/b/a, a1/a2/b, a/b1/b2, b2/b1/a/b1/b2, b2/b1/a/b1/a/b1/b2, and other arrangement, wherein "a" (for example, a1, a2, . . . ) denotes resin composition layer and "b" (for example, b1, b2, . . . ) denotes substrate resin layer. A recycled material, which is obtained by re-melt molding waste edges or scraps generated in the production of a multilayer structure, comprises EVOH resin composition and a substrate resin, and therefore may be utilized to form a multilayer structure such as b/R/a, b/R/a/b, b/R/a/R/b, b/a/R/a/b, b/R/a/R/a/R/b, wherein "R" denotes a layer of the recycled material. The number of layers included in the multilayer structure is selected from the range of usually 2 to 15, preferably 3 to 10 layers.

In the multilayer structure mentioned above, an adhesive resin layer may be interposed between the layers, if necessary.

Among these multilayer structures, a preferable multilayer structure is a multilayer structure containing at least one unit of b/a/b or b/adhesive resin layer/a/adhesive resin layer/b. In such multilayer structure, the inventive resin composition layer as an intermediate layer is sandwiched between substrate resin layers. In this case, at least one side of the resin composition layer (i.e. substrate resin layer b or adhesive resin layer) employs hydrophobic resin layer, thereby sufficient drying effect by the component (C) would be obtained because the hydrophobic resin can reduce moisture level of absorption from atmosphere. In a multilayer structure used for packaging material to be subjected to a hot water treatment, employment of hydrophobic resin layer for at least one side of the resin composition layer in the aforementioned unit of the multilayer structure can retain oxygen barrier performance of the multilayer structure even after the treatment.

Examples of the substrate resin include polyolefin-based resin in a broad sense such as polyethylene-based resins such as linear low density polyethylene, low density polyethylene, very low density polyethylene, medium density polyethylene, high density polyethylene, ethylene-propylene block- or random-copolymer, ethylene-α-olefin (having 4 to 20 carbon atoms) copolymer; polypropylene-based resins such as polypropylene, propylene-α-olefin (having 4 to 20 carbon atoms) copolymer, polybutene, polypentene, polycyclic olefin-based resin which has cyclic olefin structure in main chain and/or side chain, and other unmodified polyolefin-based resin; unsaturated carboxylic acid-modified polyolefin-based resin which is polyolefin graft-modified with unsaturated carboxylic acid or its ester, and other modified polyolefin-based resin; ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester-based elastomer, polyurethane-based elastomer, polystyrene-based elastomer, halogenated polyolefin such as chlorinated polyethylene and chlorinated polypropylene, and aromatic or aliphatic polyketones.

Typical raw material of the substrate resin is naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for the substrate resin.

Among them, hydrophobic resins including polyamide-based resin, polyolefin-based resin, polyester-based resin and polystyrene-based resin are preferred, polyolefins such as polyethylene-based resin, polypropylene-based resin, polycyclic olefin-based resin, and these modified with unsaturated carboxylic acid are more preferred, and polypropylene-based resin and polycyclic olefin-based resin are further more preferred.

A known adhesive resin is used for the adhesive resin and may be properly chosen depending on thermoplastic resin type used for the substrate resin "b". A typical adhesive resin is a carboxyl group-containing polyolefin-based resin obtained by chemically bonding unsaturated carboxylic acid or its anhydride to polyolefin-based resin through addition reaction or grafting reaction. For example, maleic anhydride graft modified polyethylene, maleic anhydride graft modified polypropylene, maleic anhydride graft modified ethylene-propylene block- or random-copolymer, maleic anhydride graft modified ethylene-ethylacrylate copolymer, maleic anhydride graft modified ethylene-vinyl acetate copolymer, maleic anhydride-modified polycyclic olefin-based resin, maleic anhydride graft modified polyolefin-based resin. These adhesive resin may be used alone or in a combination of two or more of them.

In the case of a multilayer structure in which an adhesive resin layer is interposed between the resin composition layer and the substrate resin layer, a resin having excellent hydrophobicity is preferably used for the adhesive resin because the adhesive resin layer is disposed on at least one side of the resin composition layer.

A known resin as the polycyclic olefin-based resin, which is disclosed in, for instance JP2003-103718A, JP H5-177776A, and JP 2003-504523A, may be used. The polycyclic olefin-based resin exhibits lower moisture permeability compared to linear aliphatic polyolefin such as polyethylene and polypropylene. In a sandwich type multilayer structure which includes the resin composition layer as an intermediate layer sandwiched between other thermoplastic resin layer(s) and/or adhesive resin layer(s), such polycyclic olefin-based resin is preferably employed for other thermoplastic resin layer and/or adhesive resin layer, thereby reducing moisture absorption in atmosphere or when treated with hot water. As a result, drying effect by the component (C) of the resin composition layer could be effectively obtained, which can prevent oxygen permeation even after a hot water treatment.

The substrate resin and the adhesive resin may contain plasticizer, filler, clay (e.g. montmorillonite), colorant, antioxidant, antistatic agent, lubricant, nucleating agent, anti-blocking agent, ultraviolet absorber, wax, and other conventionally known additives in a content of the range without adversely affecting the gist of the invention, for example 30% by weight or less, preferably 10% by weight or less.

Laminating the inventive resin composition layer over the substrate resin layer, if necessary interposing adhesive resin layer between them, may be performed by a known method. Examples of the lamination processes include extruding substrate resin melt over a film or sheet of the resin composition; extruding the resin composition melt over a substrate resin layer; coextruding a resin composition and substrate resin; dry-laminating resin composition layer and substrate resin layer using a known adhesive such as organic titanium compound, isocyanate compound, polyester-based compound, or polyurethane compound; coating a solution of resin composition on a film or sheet of substrate resin, and then removing the solvent of the solution. Of these processes, coextrusion is preferably employed from the viewpoint of cost and environment. The resin composition is excellent in long-run stability and thermal decomposition resistance, and therefore suitable for the coextrusion.

Thus produced multilayer structure may be subjected to (thermal) stretching process if necessary. Uniaxial or biaxial stretching may be conducted in the stretching process. In the biaxial stretching, simultaneous or sequential stretching may be employed. For the stretching technique, roll stretching, tenter stretching, tubular stretching, stretch blow molding, vacuum-pressure forming and other stretching technique including high magnification stretching may be employed. The stretching temperature is selected from the range of usually 40 to 170° C., preferably 60 to 160° C., as a temperature nearby the multilayer structure. Unduly low stretching temperature causes insufficient stretching. Unduly high stretching temperature makes difficult for maintaining stable stretched condition.

After stretching process, heat setting may be conducted for providing the multilayer structure with dimensional stability. A conventional known technique for heat setting is employed. For example, the stretched film is heat set at usually 80 to 180° C., preferably 100 to 165° C. in the period of usually 2 to 600 seconds with maintaining stretched condition.

In the case that thus obtained stretched multilayer film is used for shrink film, the stretched multilayer film is cooled in cold air for setting without heat setting treatment for the purpose of imparting thermal shrinkage property.

The multilayer structure of the invention may be formed to cup, tray and other multilayer container commonly by drawing. Specific examples of the drawing process include vacuum forming, air-pressure forming, vacuum-pressure forming, plug assist formula vacuum-pressure forming, and so on. In the case of producing a multilayer container such as tube and bottle using a multilayer parison, blow molding method including extrusion blow molding method (e.g. twin-head type, mold shift type, parison shift type, rotary type, accumulator type, and horizontal parison type), cold parison blow molding method, injection blow molding method, biaxial stretching blow molding method (e.g. extrusion cold parison biaxial stretching blow molding method, injection cold parison biaxial stretching blow molding method, and injection inline biaxial stretching blow molding method). The parison is hollow tubular article preformed before blow molding. Thus produced multilayer structure may be subjected to, if necessary, heat treatment, cooling treatment, rolling treatment, printing treatment, dry laminating, solution or molten coating treatment, bag making finish, deep drawing finish, box making finish, tube finish, sprit finish and the like.

The thickness of the multilayer structure including stretched multilayer structure as well as thickness of the respective layer constituting multilayer structure, i.e. resin composition layer, substrate resin layer, and adhesive resin layer, varies with layer arrangement, substrate resin type, adhesive resin type, use, package form, and intended physical properties. The thickness of multilayer structure including stretched multilayer structure is usually from 10 to 5000 μm, preferably from 30 to 3000 μm, particularly preferably from 50 to 2000 μm. The thickness of the resin composition layer is usually from 1 to 500 μm, preferably from 3 to 300 μm, particularly preferably from 5 to 200 μm. The thickness of the substrate resin layer is usually from 5 to 30000 μm, preferably from 10 to 20000 μm, particularly preferably from 20 to 10000 μm. The thickness of the adhesive resin layer is usually from 0.5 to 250 μm, preferably from 1 to 150 μm, particularly preferably from 3 to 100 μm.

The ratio of thicknesses of the resin composition layer to substrate resin layer in the multilayer structure, i.e. resin composition layer/substrate resin layer, is usually from 1/99 to 50/50, preferably 5/95 to 45/55, particularly preferably 10/90 to 40/60. The thickness ratio of the resin composition layer to the adhesive resin layer in the multilayer structure, i.e. resin composition layer/adhesive resin layer, is from usually 10/90 to 99/1, preferably 20/80 to 95/5, particularly preferably 50/50 to 90/10. If the multilayer structure include multiple resin composition layers, substrate resin layers or adhesive resin layers, the thickness of the most thick resin composition layer, substrate resin layer, or adhesive resin layer respectively is employed for the aforementioned thickness ratio.

Thus produced film, sheet, container made from stretched film such as bag, cup, tray, tube, bottle, and cover are useful for various packaging or container for food which is subjected to a hot water treatment because the resin composition layer of the invention can secure gas-barrier performance even after the hot water treatment.

Since the resin composition is stable at relatively high temperatures, the resin composition can be directly molded into a multilayer container or cover by coinjection process. Thus produced multilayer container or cover comprises a gas barrier layer made of the resin composition of the invention.

Also the multilayer container is useful for packaging not only general foods but also condiment such as mayonnaise and dressing, fermented food such as miso, oil and fat food such as salad oil, beverages, cosmetics, pharmaceutical preparations, and so on.

Example

The invention will be specifically explained with examples below, but these examples do not limit the invention as long as it does not exceed the gist of the invention. The term "parts" in Examples is on the basis weight unless otherwise indicated.

<Measurement and Evaluation Method>

(1) Reduction rate by thermogravimetry [250° C., 1 hour]

The produced resin composition pellets were kept at 250° C. in nitrogen atmosphere for 1 hour. The weights of pellets before and after being kept were measured with athermogravimetric analyzer "Pyrisl TGA" (ParkinElmer). The reduction rate (% by weight based on the weight before heating) was calculated with the measurement value.

(2) Heat Resistance to High Temperature [280° C., 10 Minutes]

The produced pellets 10 g were put on an aluminum cup, and placed in a constant temperature oven "IPHH-202M" (ESPEC) filled with nitrogen gas which is atmosphere protecting against oxidation. After the pellets were heated in a constant temperature oven set at 280° C. for 10 minutes, the molten pellets in the cup were brought out from the oven and cooled to be solidified, thereby obtaining a plate made of the resin composition with diameter of 55 mm and thickness of 4 mm. The plate was observed with respect to whether or not bubble occurred on the surface of the plate, and evaluated according to the following criteria.

Good: No bubble occurred

No Good: Many bubbles were observed on the surface of the plate, the bubbles being resulted from the decomposition of EVOH resin.

(3) Kneading Property

The prepared resin composition was measured with use of melt-kneading apparatus "Plastograph® (from Brabender) with respect to torques (Nm) for 5 minutes ($T_5$) and 60 minutes ($T_{60}$) of melt-kneading under the following condition:

roller mixer: W50E (feeding amount of sample: 55 g)
set temperature of apparatus: 250° C.
rotational frequency of kneader: 50 ppm (4) Long-Run Stability From the torque values (Nm) obtained from the measurement (3), the torque ratio ($T_{60}/T_5$), which is a ratio of the torque measured 60 minutes later ($T_{60}$) to 5 minutes later ($T_5$) from the starting melt-kneading, is calculated. If the resin composition has 1 or more of the torque ratio, the resin composition has an increasing tendency in viscosity. If the torque ratio is between 0.001 and 0.7, the resin composition may exhibit excellent long-run stability.

[Production and Evaluation of Resin Composition Nos. 1 to 8]

As the EVOH resin (A), a saponified ethylene-vinyl acetate copolymer having ethylene content of 29 mol %, saponification degree of 99.6%, boric acid content of 500 ppm (calculated from the measurement value by boron analysis), MFR of 4.3 g/10 minutes (210° C., load of 2160 g) and volatile matter content of 0.2%, was used. As the polyamide-based resin (B), a terminal-modified 6 nylon having melting point of 225° C. and MFR of 5 g/10 minutes (250° C., load of 2160 g) was used. The terminal-modified 6 nylon is identified by terminal COOH group of 22 μeq/g and 100×b/(a+b)=31 wherein [a] denotes a number of terminal COOH group and [b] denotes a number of terminal $CONR^{10}R^{20}$ group (wherein $R^{10}$ represents a hydrocarbon group having from 1 to 22 carbon atoms, and $R^{20}$ represents hydrogen atom or a hydrocarbon group having from 1 to 22 carbon atoms). As the drying agent (C), trimagnesium dicitrate (anhydride) from JOST CHEMICAL, having melting point of 300° C. or higher was used.

The following compounds were used as the basic metal salt.

magnesium stearate ($C_{36}H_{70}O_4Mg$): "SAK MS-P" (melting point: 145° C.) from SUNACE Inc.

calcium stearate ($C_{36}H_{70}O_4Ca$): "calcium stearate S" (melting point: 154° C.) from NOF Corporation zinc stearate ($C_{36}H_{70}O_4Zn$): "EZ-104" (melting point: 122° C.) from KATSUTA KAKO Co. Ltd.

special higher fatty acid magnesium salt (0.44MgO·($C_6H_{10}CH(OH)C_{10}H_{20}COO)_2Mg$): metal salt having melting point of 229° C., obtained by the reaction between magnesium oxide and 12-hydroxy stearic acid by heating in dry direct method.

EVOH resin, polyamide-based resin, drying agent, and basic metal salt were blended at percentages shown in Table 1, put into a feeder and melt-kneaded with a twin-screw extruder having 2 mixing zones under the following conditions. Thus prepared EVOH resin composition were extruded in a strand form and cut with drum type pelletizer, thereby obtaining columnar pellets each having diameter of 2 mm, length of 3.5 mm and volatile matter content of 0.3%.

Conditions of Melt-Kneading for Preparing Resin Composition Nos. 1 to 8
  twin-screw extruder: 32 mm diameter, L/D=56 (The Japan Steel Works Ltd.)
  setting temperature of extruder: C2/C3/C4/C5/C6/C7/C8/C9/C10/C11/C12/C13/C14/C15/C16/D=90/90/110/150/220/230/230/23 0/230/230/230/230/230/230/230/230° C.
  screw rotational frequency: 150 ppm
  discharge amount: 12 kg/hour
  cooling type of strand: air cooling
  take-off speed: 8.8 m/min.

Thus produced resin composition pellet Nos. 1 to 8 were evaluated with respect to heat resistance to high temperatures [280° C., 10 minutes], kneading property, and long-run stability. The evaluation results are shown in Table 1.

TABLE 1

| | | | Resin composition No. | | | |
|---|---|---|---|---|---|---|
| | | | 1 | 2 | 3 | 4 |
| Composition | (A) EVOH resin | | 8.0 | 8.0 | 8.0 | 8.0 |
| | (B) Polyamide-based resin | | 1.0 | 1.0 | 1.0 | 1.0 |
| | (C) Drying agent | Type | Trimagnesium dicitrate | Trimagnesium dicitrate | Trimagnesium dicitrate | Trimagnesium dicitrate |
| | | Amount (part) | 9.75 | 9.75 | 9.5 | 9.925 |
| | (D) Basic metal salt | Type | Mg Stearate | MgO·12Mg hydroxystearate | Mg Stearate | Mg Stearate |
| | | Amount (part) | 0.25 | 0.25 | 0.5 | 0.075 |
| | | Metal content (ppm) | 100 (Mg) | 137 (Mg) | 200 (Mg) | 30 (Mg) |
| Decrease rate by thermogravimetry (% by weight) [250° C. · 1 hour] | | | 5.8 | 8.0 | 15.8 | 1.0 |
| Evaluation | Heat resistance to high temperature [280° C., 10 minutes] | | Good | Good | Good | Good |
| | Torque | $T_5$ | 6.7 | 7.9 | 7.7 | 7.5 |
| | | $T_{60}$ | 3.6 | 1.9 | 0.8 | 14.2 |
| | Long-run stability $T_{60}/T_5$ | | 0.54 | 0.24 | 0.10 | 1.89 |

| | | | Resin composition No. | | | |
|---|---|---|---|---|---|---|
| | | | 5 | 6 | 7 | 8 |
| Composition | (A) EVOH resin | | 8.0 | 8.0 | 8.0 | 8.0 |
| | (B) Polyamide-based resin | | 1.0 | 1.0 | 1.0 | 1.0 |
| | (C) Drying agent | Type | Trimagnesium dicitrate | Trimagnesium dicitrate | Trimagnesium dicitrate | Trimagnesium dicitrate |
| | | Amount (part) | 9.0 | 9.85 | 9.75 | 10 |
| | (D) Basic metal salt | Type | Mg Stearate | Ca Stearate | Zn Stearate | — |
| | | Amount (part) | 1.0 | 0.15 | 0.25 | — |
| | | Metal content (ppm) | 400 (Mg) | 100 (Ca) | 250 (Zn) | — |
| Decrease rate by thermogravimetry (% by weight) [250° C. · 1 hour] | | | 37.8 | 2.2 | 1.8 | 0.8 |
| Evaluation | Heat resistance to high temperature [280° C., 10 minutes] | | Bubbles occurred | Good | Good | Good |

TABLE 1-continued

|  |  |  |  |  |
|---|---|---|---|---|
| Torque T$_5$ | 6.7 | 7.0 | 7.6 | 6.8 |
| T$_{60}$ | 0.4 | 9.6 | 8.7 | 16.2 |
| Long-run stability T$_{60}$/T$_5$ | 0.06 | 1.37 | 1.14 | 2.38 |

It is understood from Table 1 that employing higher fatty acid magnesium salt for the basic metal salt and adjusting the content of the higher fatty acid magnesium salt to 100 to 200 ppm as a metal content based on the weight of the resin composition, could provide a resin composition satisfying a reduction rate by thermogravimetry of 5% by weight or more but 35% by weight or less. Additionally the resin composition Nos. 1 to 3 exhibited resistance to high temperatures and long-run stability. These results are excellent.

On the other hand, the resin composition without basic metal salt had a reduction rate by thermogravimetry less than 5%, and strong tendency of increasing viscosity due to that the value of T$_{60}$/T$_5$ is higher than 2, which indicates insufficient long-run stability (No. 8).

In the case that the resin composition had a content of higher fatty acid magnesium salt as low as 30 ppm as a metal content based on the weight of resin composition, the reduction rate by thermogravimetry was less than 5%. Additionally, the resin composition had a strong tendency of increasing viscosity due to that the value of T$_{60}$/T$_5$ is higher than 1, which indicates insufficient long-run stability (No. 4).

In the case that the resin composition has a high content of higher fatty acid magnesium salt such as 400 ppm as Mg content based on the weight of the resin composition (No. 5), the reduction rate by thermogravimetry exceeded 35%, and bubbles occurred at higher temperatures, which means insufficient resistance to high temperatures.

In the case that higher fatty acid calcium salt or higher fatty acid zinc salt was employed as the basic metal salt, and the content of calcium or zinc based on the weight of the resin composition was adjusted to 100 ppm or 250 ppm respectively (No. 6 or 7), the reduction rate by thermogravimetry was below 5%, and the value of T$_{60}$/T$_5$ was above 1. These had a strong tendency of increasing viscosity and exhibited insufficient long-run stability.

INDUSTRIAL APPLICABILITY

The resin composition of the invention can suppress decomposition and foaming during a process at a high temperature as well as has long-run stability. Therefore the resin composition can be applied to a molding and/or forming under high temperatures such as coextrusion molding and coinjection molding with another thermoplastic resin. Moreover a multilayer structure containing a layer of the resin composition can be produced efficiently, and the resulting multilayer structure can retain gas-barrier performance even after hot water treatment such as retort treatment. For these reasons, the resin composition is useful in industry.

The invention claimed is:

1. A resin composition comprising a saponified ethylene-vinyl ester-based copolymer (A), a polyamide-based resin (B), a drying agent (C), and a basic metal salt (D);
   wherein the drying agent (C) is a hydrate-forming metal salt of a tricarboxylic acid,
   wherein the basic metal salt (D) is a metal salt of a carboxylic acid having from 12 to 30 carbon atoms,
   wherein the content of the basic metal salt (D) in the resin composition is from 40 to 2000 ppm in terms of the metal of the basic metal salt; and
   whereby the reduction of the resin composition between the weight before and after being kept at 250° C. in nitrogen atmosphere for 1 hour is 5% by weight or more but 35% by weight or less.

2. The resin composition according to claim 1, wherein the basic metal salt (D) has a melting point of 250° C. or less.

3. The resin composition according to claim 1, wherein the basic metal salt (D) is a magnesium salt and the content of the basic metal salt (D) in the resin composition is in the range of 40 to 350 ppm in terms of magnesium.

4. The resin composition according to claim 1, wherein the hydrate-forming metal salt has a melting point of 300° C. or higher.

5. A multilayer structure comprising at least one layer of a resin composition according to claim 1.

6. A method of improving long-run stability of a resin composition in a process of extrusion molding or injection molding carried out at a temperature higher than 250° C., the method comprising adjusting a reduction of the resin composition between the weight before and after being kept at 250° C. in nitrogen atmosphere for 1 hour to 5% by weight or more but 35% by weight or less, wherein the resin composition comprises a saponified ethylene-vinyl ester-based copolymer (A), a polyamide-based resin (B), a drying agent (C), and a basic metal salt (D),
   wherein the drying agent (C) is a hydrate-forming metal salt of a tricarboxylic acid,
   wherein the basic metal salt (D) is a metal salt of a carboxylic acid having from 12 to 30 carbon atoms, and
   wherein the content of the metal of the basic metal salt (D) is adjusted to 40 to 2000 ppm based on the resin composition to thereby adjust the reduction in weight of the resin composition to 5% by weight or more but 35% by weight or less.

* * * * *